US 9,494,266 B2

(12) United States Patent
Sabadie et al.

(10) Patent No.: US 9,494,266 B2
(45) Date of Patent: Nov. 15, 2016

(54) AIRCRAFT VENTILATION SYSTEM

(75) Inventors: Lionel Sabadie, Toulouse (FR); Natalia Gracheva, Colomiers (FR); Michel Dal-Cin, La Salvetat Saint Gilles (FR); Christian Banis, Leguevin (FR)

(73) Assignee: AIRBUS Operations S.A.S., Toulouse (FR)

( * ) Notice: Subject to any disclaimer, the term of this patent is extended or adjusted under 35 U.S.C. 154(b) by 1131 days.

(21) Appl. No.: 13/180,903

(22) Filed: Jul. 12, 2011

(65) Prior Publication Data

US 2012/0015595 A1   Jan. 19, 2012

(30) Foreign Application Priority Data

Jul. 13, 2010   (FR) ...................................... 10 02944

(51) Int. Cl.
*F16L 27/12*   (2006.01)
*B64C 1/40*   (2006.01)
*B64D 13/00*   (2006.01)
*F24F 13/02*   (2006.01)

(52) U.S. Cl.
CPC ............... *F16L 27/12* (2013.01); *B64C 1/406* (2013.01); *B64D 13/00* (2013.01); *F24F 13/0209* (2013.01)

(58) Field of Classification Search
CPC ................... B64D 2011/0046; F24F 13/0209; F16L 27/12; B64C 1/406

USPC ...... 454/64, 76, 136, 137; 138/106; 244/131
See application file for complete search history.

(56) References Cited

U.S. PATENT DOCUMENTS 1,334,007 A * 3/1920 White ..................... F16L 27/12
                                                                277/621
1,911,311 A * 5/1933 Ernst ..................... F16L 43/006
                                                                285/114

(Continued)

FOREIGN PATENT DOCUMENTS

DE   198 27 681 A1   12/1999
FR       1481900     5/1967

(Continued)

OTHER PUBLICATIONS

U.S. Appl. No. 13/181,074, filed Jul. 12, 2011, Sabadie, et al.

(Continued)

*Primary Examiner* — Steven B McAllister
*Assistant Examiner* — Frances F Hamilton
(74) *Attorney, Agent, or Firm* — Oblon, McClelland, Maier & Neustadt, L.L.P.

(57) ABSTRACT

A ventilation system for an aircraft having a structure bearing an exterior wall and an interior covering. At least one duct intended to be installed between the interior covering and the exterior wall. The duct includes one first pipe and at least one second pipe which is able to slide telescopically in relation to the first pipe between a retracted position and an extended position.

9 Claims, 3 Drawing Sheets

(56) References Cited

U.S. PATENT DOCUMENTS

Figure 1:
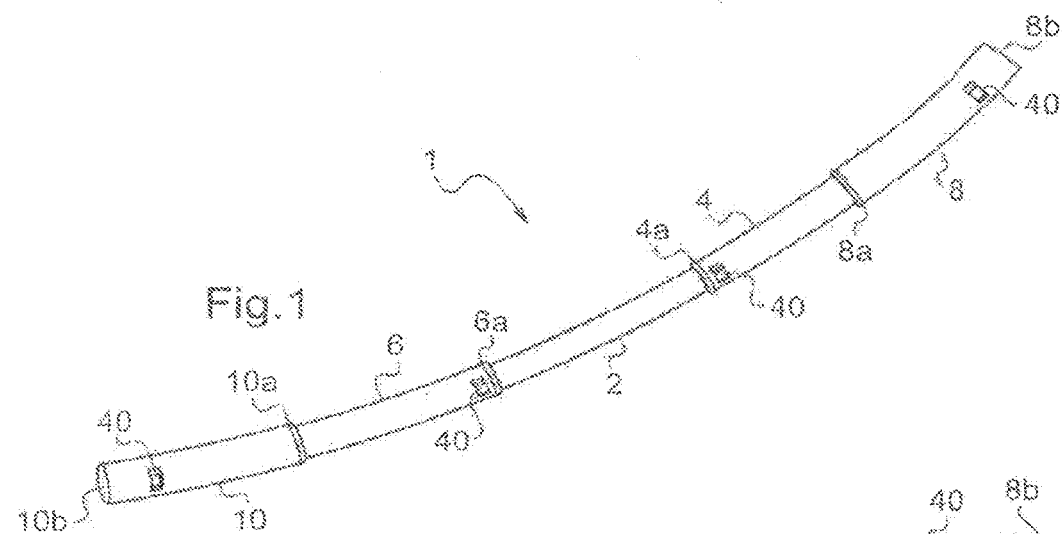

| | | | | |
|---|---|---|---|---|
| 2,375,513 | A * | 5/1945 | Bach | F16L 3/221 248/59 |
| 2,869,535 | A * | 1/1959 | Horrell | B64D 13/08 126/110 R |
| 3,941,041 | A * | 3/1976 | Sprout | 454/64 |
| 4,020,753 | A * | 5/1977 | Efstratis | 454/306 |
| 4,038,913 | A * | 8/1977 | Earley | 454/64 |
| 4,138,141 | A * | 2/1979 | Andersen | B60G 21/055 267/273 |
| 4,312,143 | A * | 1/1982 | Kado | E01H 5/045 37/261 |
| 4,543,677 | A * | 10/1985 | Haglund | B64F 1/305 138/120 |
| 5,162,018 | A * | 11/1992 | Horton | B60H 1/3407 251/100 |
| 5,556,332 | A * | 9/1996 | Schumacher | 454/76 |
| 5,630,751 | A * | 5/1997 | Hansen | 454/64 |
| 6,003,814 | A * | 12/1999 | Pike | B64D 15/04 239/587.1 |
| 6,095,595 | A * | 8/2000 | Galbraith | B60H 1/00564 138/106 |
| 6,120,090 | A * | 9/2000 | Van Ert | B29C 49/0047 280/751 |
| 6,179,343 | B1 * | 1/2001 | Byrnes | F16L 43/00 285/181 |
| 6,286,876 | B1 * | 9/2001 | Jasperse et al. | 285/260 |
| 6,299,525 | B1 * | 10/2001 | Scheffler | B64D 13/06 244/118.5 |
| 6,311,731 | B2 * | 11/2001 | Labes | 138/106 |
| 6,354,937 | B1 * | 3/2002 | Crook | 454/292 |
| 6,491,254 | B1 * | 12/2002 | Walkinshaw | A62C 3/08 244/118.5 |
| 6,536,710 | B1 * | 3/2003 | Bobzien | B64C 1/066 244/119 |
| 6,595,554 | B2 * | 7/2003 | Byrnes | F16L 43/00 285/179 |
| 6,641,093 | B2 * | 11/2003 | Coudrais | F16L 3/13 248/68.1 |
| 6,669,552 | B1 * | 12/2003 | Beer | E21F 1/04 454/171 |
| 6,881,021 | B1 * | 4/2005 | Winter | B66C 1/12 212/231 |
| 7,334,420 | B1 * | 2/2008 | Garris | 62/259.1 |
| 7,608,782 | B2 * | 10/2009 | Hill | H01R 4/48 174/84 C |
| 8,002,218 | B2 * | 8/2011 | Johnson | B64D 11/003 165/235 |
| 8,262,023 | B2 * | 9/2012 | Kofinger | B64C 1/066 244/118.5 |
| 2001/0029162 | A1 * | 10/2001 | Yoshinori | B60H 1/00007 454/137 |
| 2002/0144474 | A1 * | 10/2002 | Satomi et al. | 52/173.1 |
| 2004/0132590 | A1 * | 7/2004 | Papas | A63B 15/00 482/109 |
| 2005/0006900 | A1 * | 1/2005 | Lewis | B21C 1/22 285/370 |
| 2005/0044712 | A1 * | 3/2005 | Gideon | B60R 13/02 29/897.32 |
| 2005/0130577 | A1 * | 6/2005 | Butera et al. | 454/76 |
| 2005/0152749 | A1 * | 7/2005 | Anres | E21B 7/043 405/224 |
| 2008/0236640 | A1 * | 10/2008 | Huali | A45B 23/00 135/20.3 |
| 2008/0308674 | A1 * | 12/2008 | Frantz et al. | 244/118.5 |
| 2009/0298408 | A1 * | 12/2009 | Reisbach | B64D 13/00 454/76 |
| 2010/0240290 | A1 * | 9/2010 | Markwart et al. | 454/71 |
| 2010/0297924 | A1 | 11/2010 | Hedlund et al. | |
| 2011/0009042 | A1 * | 1/2011 | Joern | B64C 1/067 454/71 |
| 2011/0030406 | A1 * | 2/2011 | Ichikawa | B60H 1/00378 62/244 |
| 2012/0187245 | A1 * | 7/2012 | Goehlich | B32B 5/32 244/119 |
| 2012/0248244 | A1 * | 10/2012 | Brownjohn | B64C 1/061 244/118.5 |
| 2014/0273787 | A1 * | 9/2014 | McCammon | B64D 13/00 454/76 |

FOREIGN PATENT DOCUMENTS

| | | | | |
|---|---|---|---|---|
| GB | | 859057 | 1/1961 | |
| GB | | 859057 A * | 1/1961 | B64D 13/00 |
| GB | | 1116612 A * | 6/1968 | B29D 23/006 |
| WO | WO 2009/091328 A1 | | 7/2009 | |

OTHER PUBLICATIONS

French Preliminary Search Report issued Feb. 23, 2011, in French 1002944, filed Jul. 13, 2010 (with English Translation of Categories of Cited Documents).

* cited by examiner

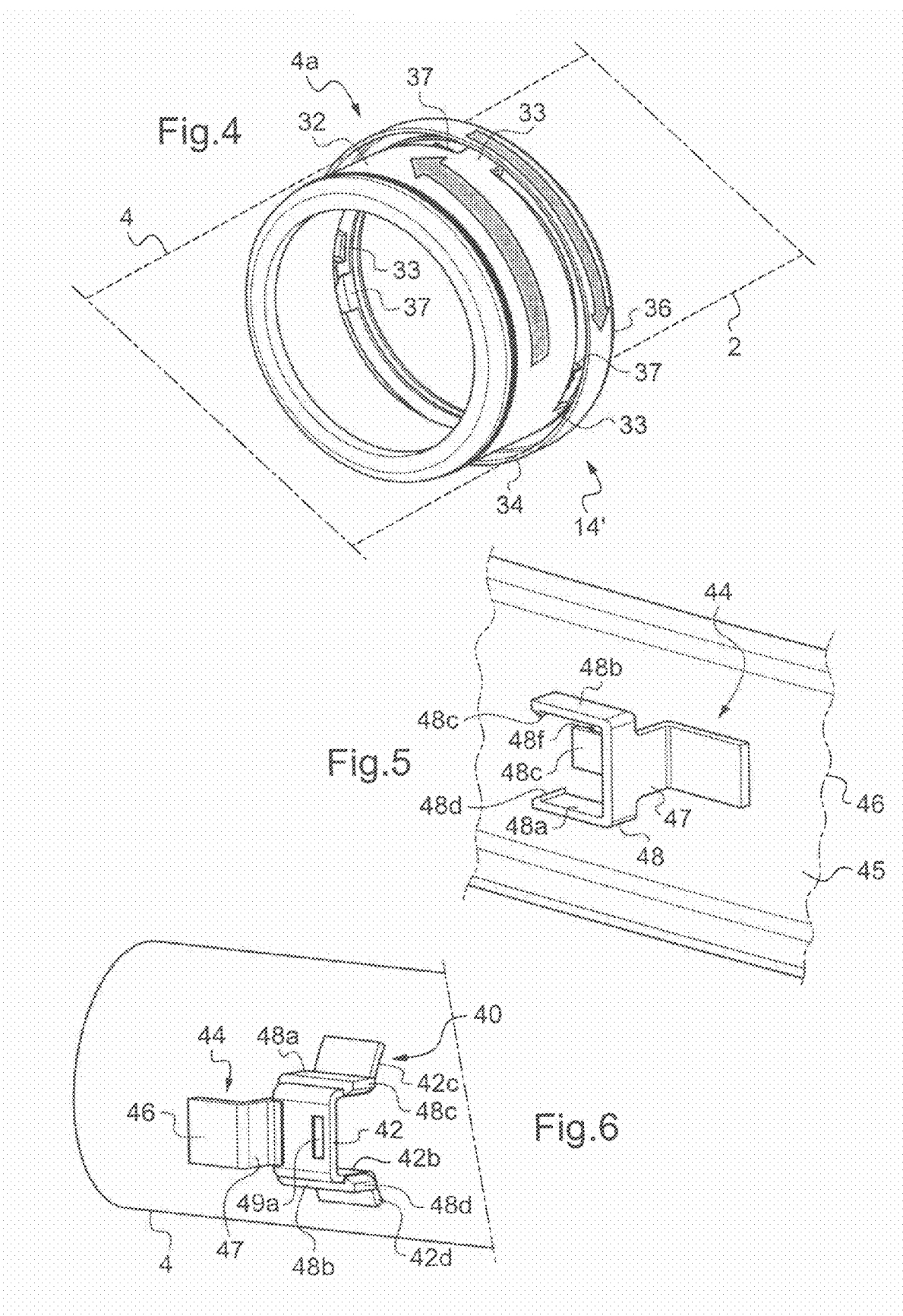

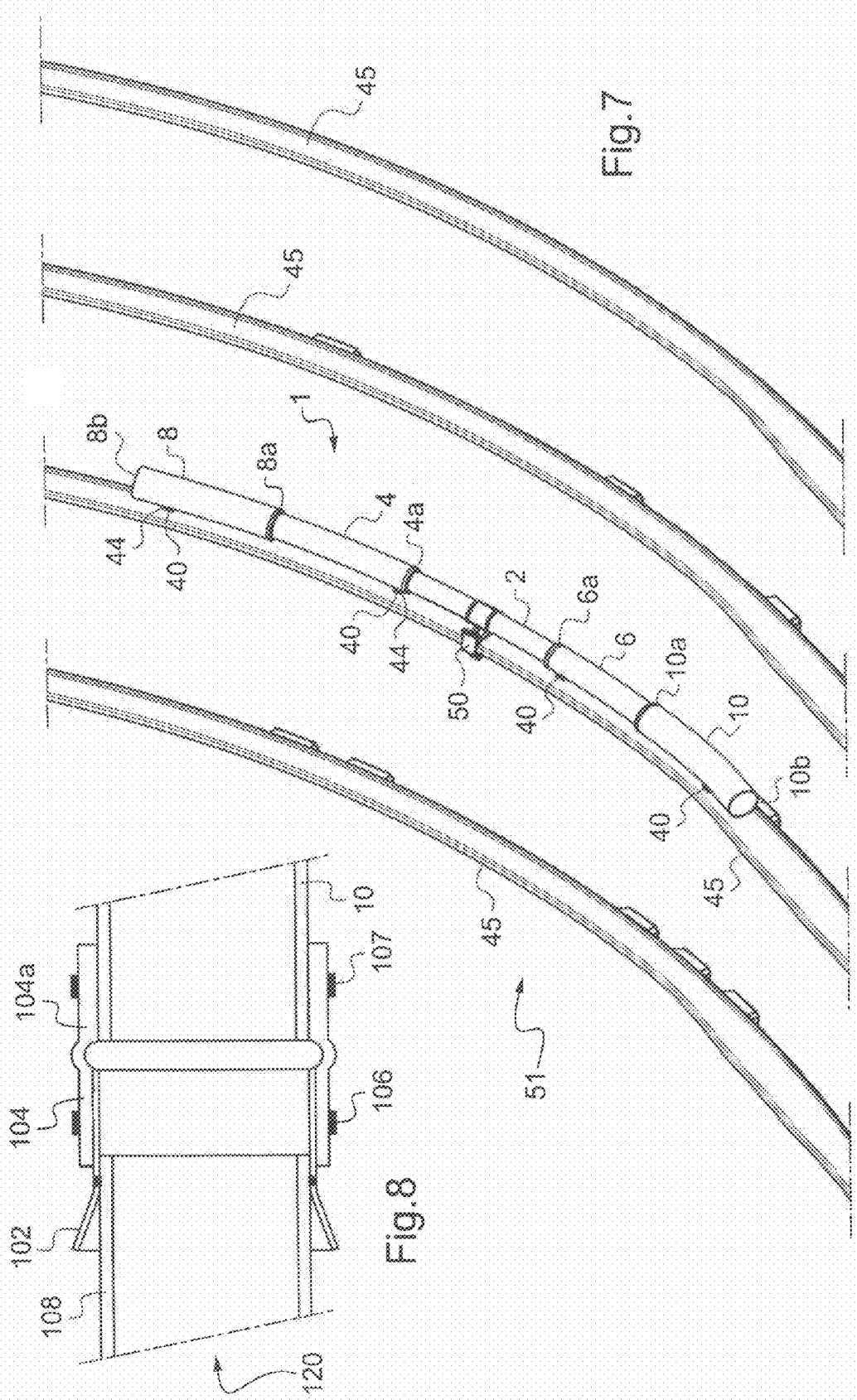

AIRCRAFT VENTILATION SYSTEM

This invention relates to a ventilation system for an aircraft.

The structure of the fuselage of an aircraft usually is made up of frames extending in transverse planes, stringers extending more or less along a longitudinal direction of the aircraft outside the frames, and a skin that covers the said stringers and is fastened thereto. The skin also is fastened to the frames, through connecting pieces known under the name of "clip" or "stabilizer."

In the cabin in particular, the interior faces of the fuselage are covered successively by insulation blankets, producing a thermal and sound insulation of the cabin, and by covering panels the interior face of which remains visible from the cabin and thus forms a finish face. Between two successive frames of the fuselage, the skin of the said fuselage is covered by insulation blankets called field blankets (in English: "field blankets"). Each frame of the fuselage is further covered by a blanket called frame blanket (in English: "frame blanket"). An overlap zone may be provided between consecutive frame and field blankets.

Between the insulation blankets and the covering panels, systems are arranged (equipment items, electric cables, hydraulic and pneumatic systems . . . ).

These systems usually are fastened to the structure of the fuselage by localized fastening devices traversing the insulation blankets covering the said structure. Thus, for example, the electric cables are fastened to the frames of the fuselage with the aid of localized fastening devices comprising a rod which traverses the frame and the blanket or blankets which cover it. These localized fastening devices also comprise washers for locking the rod on both sides of the frame, and a lug into which a quick-clamping collar receiving one or more cables comes to engage. As regards the piping provided for the circulation of conditioned air, it usually is fastened to the stringers, with the aid of localized fastening devices comprising a clamping collar borne by a support fastened to a stringer by screws; these screws traverse the stringer and the field blanket covering the latter.

The ducts provided for conditioned air circulation generally consist of a single piece with circular section, from the floor to the ceiling of an aircraft cabin. For this reason the air ducts are cumbersome and therefore may be subject to many impacts during transport. Finally, the large size of the ducts makes handling thereof awkward, allowing only little choice as to the moment for fastening the ventilation system at the time of assembly of the aircraft.

The invention proposes to remedy these drawbacks and to provide a ventilation system for an aircraft, non-cumbersome, simple to install and minimizing the risks of impacts or damage during transport.

For this purpose, this invention proposes a ventilation system suitable for an aircraft having a structure bearing an exterior wall and an interior covering, the said ventilation system having at least one duct intended to be accommodated between the interior covering and the exterior wall, characterized in that the duct comprises one first pipe and at least one second pipe able to slide telescopically in relation to the first pipe between a retracted position in which the greater part of the exterior pipe covers the interior pipe and an extended position in which the greater part of the exterior pipe extends beyond the interior pipe, the first pipe being able to be either an interior pipe or an exterior pipe, the second pipe then being conversely either an exterior pipe or an interior pipe.

This makes it possible to considerably reduce the space occupied by the ventilation system during transport, while reducing the risks of impacts or damage because the pipes also are more compact. Finally, the small size of the system makes handling thereof easier, allowing a greater flexibility during assembly and maintenance operations.

In the description presented with reference to the attached drawings, the first pipe is an interior pipe and the second pipes are exterior pipes. It also is conceivable, however, to have an exterior first pipe with interior second pipes.

According to a first embodiment, the duct for the ventilation system comprises a first pair of second pipes situated on both sides of the first pipe. The second pipes of this first pair of pipes are, for example, of the same length, more or less equal to half that of the first pipe. Such an embodiment has the advantage of achieving a compact and robust system.

A preferred variant provides for the duct for the ventilation system to comprise a second pair of second pipes, each pipe of this second pair of pipes being installed sliding telescopically in relation to a second pipe of the first pair of second pipes. In retracted position, the second pipes of the first pair of pipes may meet at the middle of the first pipe, the outermost second pipes then preferably covering the other second pipes over at least most of their length.

In order to produce a good seal between the pipes installed sliding on one another, an O-ring advantageously is used.

After assembly of the ventilation system, so as to ensure that the pipes remain in extended position and do not slide further into one another, each second pipe advantageously comprises a locking system making it possible to hold it in extended position. In particular, this makes it possible to facilitate installation by preventing the pipes from reverting to retracted position and to make the assembly more secure once the system is installed.

To create a compact duct for transport in retracted position, the second pipes in contact with the first pipe meet at the middle of the first pipe.

So as to ensure fastening of the first pipe to the structure, the system further comprises, for example, a device for holding the ventilation system intended for fastening the first pipe onto the structure and comprising a collar tightly holding the said first pipe. The system then is effectively and reliably interlocked with the structure.

This invention also relates to an aircraft comprising a structure bearing an exterior wall and an interior covering, characterized in that it comprises at least one ventilation system such as described above.

As is usual in an aircraft, the duct for the ventilation system preferably is situated between the exterior wall and the interior covering in this aircraft.

Ventilation system piping usually is fastened to the stringers of the structure of the aircraft with the aid of localized fastening devices comprising a clamping collar borne by a support fastened to a stringer by screws. So as to facilitate installation, this invention provides for the second pipes of the ventilation system of the aircraft according to the invention to comprise attachment means, for example on their outer wall, just like the structure of the aircraft which comprises complementary attachment means intended to receive the attachment means of a corresponding second pipe when the second pipe is in extended position.

Finally, when the structure of the aircraft comprises frames, the complementary attachment means advantageously are interlocked with these frames so as to reduce the space occupied by the ventilation system and to ensure a good holding thereof. The first pipe also may be fastened onto such a frame with the aid of a collar, for example.

Figure 2:
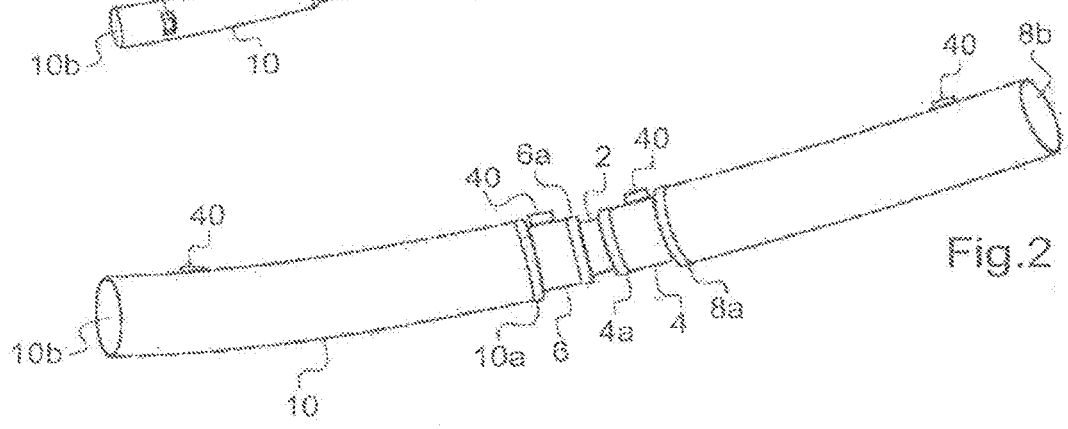
Figure 3:
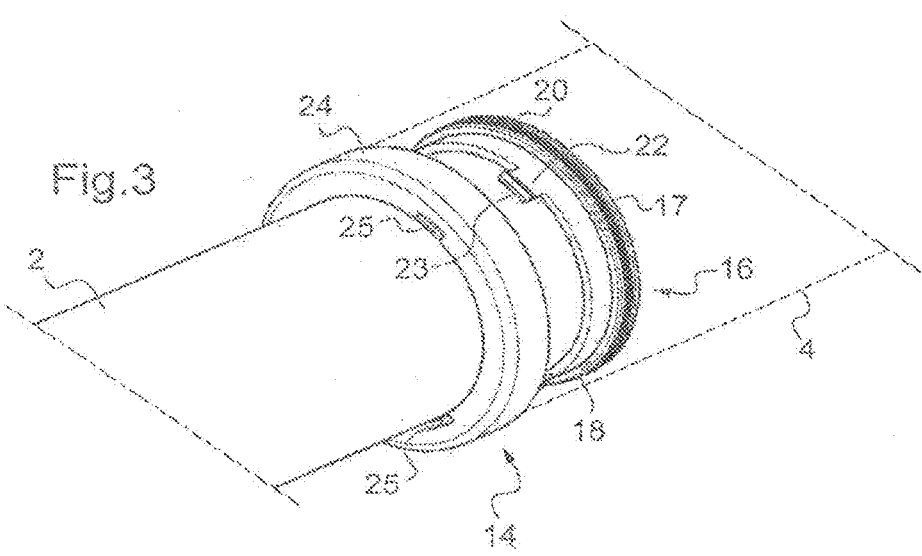

Other details and advantages of this invention will become apparent upon reading of the following description, which refers to the attached schematic drawings and relates to preferred embodiments, provided by way of non-limitative examples. On these drawings:

FIG. 1 shows a schematic view in perspective of a duct according to the invention in deployed position, FIG. 2 shows a schematic view in perspective of the duct of FIG. 1 in retracted position, FIG. 3 shows a schematic view in perspective of a first embodiment of a locking system for a ventilation system according to the invention, FIG. 4 shows a schematic view in perspective of a second embodiment of a locking system for the ventilation system according to the invention, FIG. 5 shows a schematic view in perspective of a detail of a frame onto which the ventilation system is fastened, and of a fastening clip, FIG. 6 shows a schematic view in perspective of a detail of the ventilation system according to the invention having a fastening support for an exterior pipe of the system according to the invention, FIG. 7 shows in perspective an overall schematic view of the ventilation system, and FIG. 8 shows a view in cross section of the means for connecting the ventilation system to the exterior ventilation circuit.

FIG. 1 shows a duct 1 of more or less cylindrical shape, curved along its fixed axis so as to conform in shape to a structure 51 (FIG. 7) to which it is fastened in assembly position.

In the embodiment presented in FIG. 1, duct 1 is made up of a first pipe, referred to as interior pipe 2, of curved cylindrical shape as stated above. Two first exterior pipes 4, 6, with diameter greater than interior pipe 2 and curved so as to extend the arc formed by interior pipe 2 to conform to the shape of the structure, are situated on both sides of said interior pipe 2. They slide on interior pipe 2, so that in retracted position they meet at the middle of interior pipe 2 as illustrated in FIG. 2. In this retracted position, the two exterior pipes 4, 6 may either come into contact with one another, or allow a small space to remain between them as illustrated. In this retracted position, the greater part of each of exterior pipes 4, 6 covers interior pipe 2, while in the extended position, the greater part of exterior pipes 4, 6 extends beyond interior pipe 2. In this way, the two exterior pipes 4, 6 and interior pipe 2 are installed telescopically.

Respective proximal ends 4a, 6a of exterior pipes 4, 6 contain in particular an O-ring 20 ensuring the seal of the connection between the interior pipe and the corresponding exterior pipe.

In the embodiment described in FIG. 1, a second pair of exterior pipes 8, 10 with diameter greater than that of the first pair of exterior pipes 4, 6 are able to slide on the first pair of exterior pipes 4, 6. Each exterior pipe 8, 10 respectively of the second pair of pipes slides on a pipe 4, 6 respectively of the first pair of pipes. All these pipes are curved so as to extend the arc formed by the first pair of exterior pipes 4, 6 to conform to the shape of the structure. Respective proximal ends 8a, 10a of the second exterior pipes also contain an O-ring.

Duct 1 in retracted position is shown in FIG. 2. In this position, the second pair of exterior pipes 8, 10 fully and respectively covers the first pair of exterior pipes 4, 6 up to attachment means 40 situated on the exterior surface of exterior pipes 4, 6 which function as a stop. The first pair of exterior pipes 4, 6 covers interior pipe 2 on each side, for example so as to leave a space between the proximal ends of these pipes.

A first embodiment of the system for locking the exterior pipes in extended position is detailed in FIG. 3. This first locking system 14 comprises a first ring 16 situated at the end of interior pipe 2. This ring 16 comprises a base 17 and an extension 18. Base 17 comprises in particular a groove making it possible to accommodate an O-ring 20. Extension 18 comprises elastic lugs 22 extending along the axis of the pipe and toward the center of interior pipe 2. These lugs are, for example, three in number (only one lug 22 is visible), preferably distributed evenly every 120° on ring 16, and are each equipped with a tooth 23. Locking system 14 further comprises a second ring 24 situated at the end of exterior pipe 4 facing first ring 16. This second ring 24 comprises apertures 25, for example three in number (only two apertures 25 are visible), advantageously distributed evenly every 120° on ring 24. Each aperture 25 allows passage of a lug 22 and attachment thereof by ratcheting with the aid of corresponding tooth 23. This ratcheting mechanism ensures holding of exterior pipe 4 in extended position.

A second embodiment of the system for locking the exterior pipes in extended position is detailed in FIG. 4. This second locking system 14' comprises a first ring 32 situated at the end of interior piping 2. This ring 32 comprises in particular a groove making it possible to accommodate an O-ring 34. Ring 32 further comprises lugs 33, for example three in number, preferably evenly distributed every 120° on ring 32. Second locking system 14' further comprises a second ring 36 situated at the end of exterior piping 4 facing first ring 32. This second ring 36 comprises in particular notches 37, for example three in number and preferably distributed evenly every 120° on ring 36. So as to ensure locking, lugs 33 engage by rotation into corresponding notches 37 provided for this purpose. A stop at the bottom of notches 37 ensures a correct positioning of the lugs in the notches and a ratcheting mechanism makes it possible to hold them in this locked position. This engagement by rotation ensures holding of exterior pipe 4 in extended position.

An element of the complementary attachment means of structure 51 is illustrated in FIGS. 5-7. Structure 51 comprises in particular a frame 45, with which an attachment element 44 is interlocked through a lug 46 in the form of a square, directed along the axis of the frame. Projecting part 47 not integral with the frame of lug 46 bears a fork 48 comprising three branches 48a, 48b, 48c extending in the opposite direction from the extension of lug 46. Branch 48c is offset in relation to branches 48a and 48 48b toward frame 45, being situated for example at the center of projecting part 47. Branch 48c is equipped with a tooth 48f allowing ratcheting in an aperture provided for this purpose in an attachment means 40 integral with a corresponding exterior pipe (FIG. 6). The two branches 48a and 48b respectively are equipped with a tooth 48d, 48e allowing a complementary fastening to complementary fastening means 40.

An element of the complementary fastening means integral with an exterior pipe is presented in FIG. 6, in position of attachment with element 44. This attachment element 40 integral with pipe 4 comprises a base 42 or more or less rectangular shape, equipped with two sides 42a, 42b extending perpendicular to base 42, toward the surface of exterior pipe 4, so that the combination of the base and the sides has a U-shaped section. These sides are supported by two lugs 42c, 42d integral with exterior pipe 4, each extending over the surface of the pipe so as to conform to the circular shape thereof over a short distance. Body 42 comprises an aperture 42e close to its periphery, for example of rectangular shape, into which tooth 48f of branch 48c of fork 48 of attachment element 44 comes to be inserted. In addition to this first fastening, the other two branches 48a, 48b of fork 48 come to be attached via their teeth 48c, 48d respectively to the edges of sides 42a, 42b, so as to be in contact with these sides over their entire length.

The ventilation system as a whole fastened onto an aircraft structure is presented on FIG. 7. This structure comprises frames 45, for example with Z-shaped section. On this FIG. 7, the frames are four in number but a single duct 1 is shown in deployed position. Duct 1 is installed on frame 45 via attachment means 44 (only two of them are shown) situated on the surface of frame 45 onto which it is fastened, ratcheted on attachment means 40 respectively situated on the outer surfaces of exterior pipes 4, 6, 8, 10. Duct 1 is further retained on frame 45 via an attachment system 50 comprising a collar tightly holding interior pipe 2 in its central part.

Distal ends 8b, 10b respectively of the second pair of exterior pipes 8, 10 shown in FIG. 1 comprise means for connection to the air system of the aircraft as illustrated in FIG. 8. These connection means ensure the connection of duct 1 to the ventilation system of aircraft 120. A piping 108 of the ventilation system is connected to exterior pipe 10 of duct 1 via a conical part 102 into which it is inserted. This conical part is made up of a cylindrical sleeve, widened at its end in contact with piping 108 so as to form a cone, and is equipped with an inner joint. It makes it possible in particular to correct any alignment error. A joint 104 ensures the seal of the connection between exterior pipe 10 of duct 1 and piping 108 of the ventilation system. It is made up of a cylindrical sleeve extending on both sides of a contiguous part 104a situated around the contact surface between exterior pipe 10 and piping 108. This joint 104 is placed on both sides of the contact surface between these two elements, over conical part 102 on the system 120 side and directly on exterior pipe 10 on the duct 1 side. It is made, for example, of silicone-coated fiberglass. Two clamps 106, 107 disposed on both sides of contiguous part 104a, for example symmetrically, allow the assembly to be made more secure.

For implementation of a duct 1 such as described above, once interior pipe 2 is fastened onto frame 45, it suffices to have the exterior pipes slide and to come to attach them in the complementary attachment means provided on the structure for installing the said duct. The free ends of the exterior pipes then are connected to the rest of the ventilation system as described above.

The implementation of a ventilation system according to this invention saves an appreciable amount of time during installation. Installation as well as maintenance is facilitated because shorter ducts are to be handled. Moreover, the fact of not being hampered by long elements during installation allows a greater flexibility in the order of installation of the various systems and other elements. In addition, dismantling and/or replacement of a telescopic duct described above is accomplished easily and rapidly.

Upon reading the preceding description, the individual skilled in the art immediately observes that the telescopic duct described can be used for producing several lengths. If the exterior pipes are not entirely deployed, they then form a duct of lesser length. A standardization therefore may be introduced in this way. Instead of providing ducts of different lengths, or having to adapt the length of a duct at the installation site, a single type of duct as described above may be used.

Installation of a ventilation system according to this invention has no impact on the structure of the aircraft. The complementary attachment elements, just like the means for fastening the interior pipe, may be bonded onto the frames, thus not weakening the structure.

Of course, this invention is not limited to the embodiments described above by way of non-limitative examples. It also relates to all the embodiment variants within the capacity of the individual skilled in the art in the context of the claims below.

The invention claimed is:

1. Ventilation system for an aircraft having a fuselage structure including a plurality of transverse frames which separate an exterior skin of the fuselage from an interior skin of the fuselage, said ventilation system comprising:
   at least one duct coupled to at least one of said frames and accommodated between the interior skin of the fuselage and the exterior skin of the fuselage, the duct comprising:
   one first pipe having a curved shape;
   at least one second pipe having a curved shape and slidably coupled to the first pipe such that the second pipe is able to slide telescopically in relation to the first pipe between a retracted position in which the greater part of the second pipe covers the first pipe and an extended position in which the greater part of the second pipe extends beyond the first pipe so as to extend an arc formed by the first pipe and to provide a static duct structure for coupling to the at least one of said frames, the first pipe being an interior pipe, the second pipe then being conversely an exterior pipe, wherein the at least one first pipe and the at least one second pipe have corresponding curved shapes such that the at least one second pipe slides telescopically in relation to the at least one first pipe while each pipe is in its curved state;
   a complementary holding device which fastens the at least one second pipe onto the fuselage structure of the aircraft, the device comprising at least a first attachment device interlocked through a lug to the frame, and at least a second attachment device integral with a corresponding outer surface of an exterior second pipe exterior, such that the at least second attachment device is integral with and extending from the at least one second pipe exterior, and the at least a first attachment device coupled to and extending from the at least one frame, wherein the at least first and second attachment devices couple to form a complementary holding device; and
   a locking system which locks the at least one second pipe in an extended position, the system comprising:
   a first ring situated at an end of an interior pipe and a second ring situated at an end of an exterior pipe, the first ring facing the second ring;
   the first ring comprising lugs distributed circumferentially on the first ring;
   the second ring comprising notches or apertures distributed circumferentially on the second ring;
   such that the first ring lugs and second ring notches or apertures combine to form a ratcheting mechanism that ensures holding the exterior pipe in an extended position.

2. Ventilation system for an aircraft according to claim 1, wherein the second pipe comprises a first pair of second pipes situated on opposing ends of the first pipe, the first pair of second pipes being of the same length, which is approximately equal to half that of the first pipe.

3. Ventilation system according to claim 2, wherein the duct further comprises a second pair of second pipes, each pipe of this second pair of second pipes being installed sliding telescopically in relation to the first pair of second pipes, and in retracted position, the first pair of second pipes meet at the middle of the first pipe, and the second pair of second pipes cover the first pair second pipes over at least most of their length.

4. Ventilation system according to claim 1, further comprising a seal between two pipes installed sliding on one another, the seal including an O-ring.

5. Ventilation system according to claim 1, wherein each second pipe comprises a locking system making it possible to hold each second pipe in are extended position.

6. Aircraft comprising:
 a fuselage structure including a plurality of transverse frames which separate an exterior of the fuselage from an interior of the fuselage; and
 a ventilation system according to claim 1.

7. Aircraft according to claim 6, wherein each of the second pipes comprises an attachment device on an outer wall, the structure of the aircraft comprising a complementary attachment device intended to receive the attachment device for a corresponding second pipe when the second pipe is in extended position.

8. Aircraft according to claim 7, wherein the complementary attachment device is integral with a corresponding frame.

9. Aircraft according to claim 8, wherein each first pipe is fastened onto a corresponding frame with the aid of a collar.

* * * * *